United States Patent [19]
Naab
[11] Patent Number: 4,613,271
[45] Date of Patent: Sep. 23, 1986

[54] UNIVERSAL DEVICE TO EMPTY DIFFERENT-STYLE GARBAGE CONTAINERS

[75] Inventor: Jakob Naab, Mainz-Laubenheim, Fed. Rep. of Germany

[73] Assignee: Zöller-Kipper GmbH, Mainz-Laubenheim, Fed. Rep. of Germany

[21] Appl. No.: 728,950

[22] Filed: Apr. 30, 1985

[30] Foreign Application Priority Data

Mar. 21, 1985 [DE] Fed. Rep. of Germany ....... 3510168

[51] Int. Cl.[4] ........................ B65G 65/23; B65G 67/04
[52] U.S. Cl. ........................................ 414/303; 403/4; 403/347; 414/408; 414/421
[58] Field of Search ............... 414/303, 406, 408, 420, 414/421, 422; 403/4, 347

[56] References Cited

U.S. PATENT DOCUMENTS

| | | | |
|---|---|---|---|
| 4,042,137 | 8/1977 | Hughes et al. | 414/421 X |
| 4,365,922 | 12/1982 | Borders | 414/406 |
| 4,479,751 | 10/1984 | Wyman et al. | 414/406 |

FOREIGN PATENT DOCUMENTS

| | | | |
|---|---|---|---|
| 2606599 | 8/1977 | Fed. Rep. of Germany | 414/422 |
| 3024081 | 1/1981 | Fed. Rep. of Germany | 414/408 |

*Primary Examiner*—Robert J. Spar
*Assistant Examiner*—Stuart J. Millman
*Attorney, Agent, or Firm*—H. Gibner Lehmann; K. Gibner Lehmann

[57] ABSTRACT

A device for emptying different designs of containers including a lifting-tilting mechanism having a locking mechanism for engaging a container and an additional locking hook having an actuating mechanism which may be selectively adjusted so that the locking hook operates either in an operative or an inoperative mode depending on the type of container being emptied.

15 Claims, 15 Drawing Figures

UNIVERSAL DEVICE TO EMPTY DIFFERENT-STYLE GARBAGE CONTAINERS

This invention relates to a device to empty containers of different design, such as garbage containers of different systems, into a pour-in opening by means of a tilting mechanism or lifting-tilting mechanism which is equipped with (1) carrying elements holding the container during the emptying process and gripping under projecting parts of the container; (2) with a tilt support provided with an abutment for the container wall, said abutment mounted so as to be spaced below said carrying elements; and (3) with at least one locking mechanism to secure the container against its projecting parts sliding off the carrying elements and against the container wall pivoting off the tilt support abutment.

Known from German Pat. No. 1 192 583 is an emptying device for large garbage containers which contains a tilt support with forklike carrying elements gripping under the outwardly projecting circumferential rim of the large garbage container and a locking frame with forklike components towards which the outwardly projecting rim of the large garbage container opening is lifted by means of the tilt support and its carrying elements. To be able to empty with this device also garbage cans or garbage barrels, i.e. garbage containers of other systems, the tilt support and the locking mechanism have templatelike plates pivotable into and out of their operating position, designed to accommodate the round shape and size of the cross-section opening area on garbage cans or garbage barrels. These carrying templatelike locking plates, pivotal into and out of their operating position, are bulky parts which do not permit a compact, simple design of the emptying mechanism. While it is possible to rearrange these known emptying devices then and there in accordance with the requirements for emptying large garbage containers or for emptying garbage cans or barrels, the rearranging work required is relatively extensive and requires much effort on the part of the operating personnel.

Also known already from German Disclosure 26 06 599 is an emptying device which, for emptying large garbage containers, has carrying arms that can be flipped down, receiving the large garbage container between them, said arms having claws at their free ends engaging lateral seating elements such as pins or handles of the large garbage container. In the tilt-in position, the large garbage container is locked by the appropriately designed claws or by the locking elements provided on the claws. To be able to also accommodate smaller garbage containers with this device, where these smaller garbage containers have seating strips at the rims of their openings, an additional tilt support was provided on each flip-down carrying arm, which tilt support occupies its operating position in the flipped-down state of the respective carrying arm.

To lock the smaller garbage containers in tilt-in position, separate locking mechanisms were provided on each of these additional tilt supports. In this known device, too, the additional tilt supports represent bulky elements which, when emptying large garbage containers are additional hazards and constitute additional dead weight.

Finally there is known from German Pat. No. 1 236 403 a device to empty large garbage containers, which has lateral, mutually spaced carrying arms, receiving between them the large garbage container to be emptied and having claws at their free ends to engage lateral carrying elements of the large garbage containers. In this device as well, locking of the large garbage container in tilt position occurs through the claw design or through locking elements provided in the claws. To be able to empty smaller garbage containers such as garbage barrels or garbage cans, there was provided on the pivot shaft of the carrying arms, in the space between the carrying arms, an additional tilting device or lifting-tilting device with its own tilt support. This additional tilting device or lifting-tilting device had its own locking mechanism for the garbage container to be emptied. In this prior device also, the additional tilting mechanism or lifting-tilting mechanism represented a bulky component. Moreover, in this known device, emptying of the smaller garbage containers was uneconomical, and it was used in exceptional cases only, in view of the great dead weight represented by the carrying arm assemblages.

In contrast thereto, the problem underlying the invention is to create an improved device to empty containers of different design where there are provided on a tilt carrier adapted for use with containers of any design, novel carrying elements and locking elements which are adapted to handle the designs of different containers, requiring the least possible cost for components, needing little space, and being light-weight and adjustable as automatically as possible to the particular design of the respective container or else adjustable by the operating personnel with just one or as few manipulations as possible to the particular design of the container respectively to be emptied.

According to the invention, this problem is solved in that at least one gripper as an additional carrying element and at least one additional locking mechanism are provided on the tilt support, the gripper being elastically movable from its gripping position in which it projects from the tilt support towards a container to be accommodated, into a passive, retracted position, while the additional locking mechanism contains at least one locking hook which is movably mounted on the tilt support in the space located between the abutment and the carrying element and which can be moved by means of an actuating mechanism controlled by the motion of the tilt support into or out of a hook seat provided on the container wall part opposite the tilt support during the emptying process, the locking hook actuating mechanism being designed either to be turned on or off for operation or for resilient actuation of the locking hook, and being provided with counterlocking devices.

What is achieved by the invention is that one single tilt support already representing a minimum of complexity for the seating and support of the containers to be emptied, is provided for containers of any design in question. Due to the gripper provided as an additional carrying element and adapted to be ready for operation at any time in its position wherein it projects relative to the tilt support and to be movable into its passive position whenever it is not needed, and due to the provision of the additional locking mechanism whose locking hook is movable into a hook seat, there is always assured a reliable seating, holding and locking safety for containers of any design in question on the tilt support. The operation of the locking hook in its locked position and its unlocked position is derived from the motions of the tilt support itself. If the adjustment of the additional locking mechanism to the design of the container respectively to be emptied is not capable of being automatic, the operating personnel need perform only one turn-on or turn-off operation which can be of a mechanical, pneumatic, hydraulic, or electrical nature, but in any case which requires only one single manipulation.

In one embodiment of the invention the gripper is provided with a switch actuator to turn the actuating mechanism on and off. This achieves the result that the gripper provided according to the invention serves at the same time as a keying element for the on and off actuation of the additional locking mechanism. For instance, it is possible in this manner for the gripper to also turn on the additional locking mechanism or to keep it turned on for those containers requiring emptying where the gripper is active as an additional carrying element when in its gripping position, while the gripper at the same time turns off the additional locking mechanism when emptying those containers which shift the gripper into its passive, retracted position as they are being loaded onto the tilt support. In those cases where containers must be emptied which require only the additional locking mechanism but not the gripper as an additional carrying element, it can be so arranged that the switch actuator, the turn-on and turn-off device, and/or the actuating device of the additional locking mechanism are selectively separable in their mutual interactive connection.

In a preferred embodiment of the invention the gripper can be swung about a horizontal shaft, countering the constant force of its own weight or of a spring, from its gripping position in which it projects from the tilt support into its retracted passive position at the tilt support. This makes it possible to move the gripper from the wall of the container to be emptied into the passive position retracted on the tilt support. As soon as such a container is removed from the tilt support, however, the gripper returns to its gripping or ready position projecting from the tilt support. The gripper itself may be adapted to the respective design of the container in question for emptying; for instance the gripper may be designed and mounted to engage a handlelike element provided on the wall of the container to be emptied.

In a preferred embodiment of the invention, the additional locking mechanism contains a locking lever pivotable about a horizontal shaft and an actuating rod linked thereto. This actuating rod, particularly simple in design, is a reliable element to produce from the tilt support motions the locking and unlocking motions of the locking lever. In this connection, a particularly simple and advantageous embodiment provides for the actuating rod to be guided in an element that approaches the locking lever bearing during the time of upward motion of the tilt frame, thereby to be axially movable; and provides for an adjustable setting member to block such axial shifting of the actuating rod selectively. This embodiment of the invention is particularly well suited in conjunction with lifting-tilting devices in which the tilt support is mounted by means of a four-joint guide including a pivot arm or pivot arm pair. The locking lever can then be mounted in the lower area of the tilt support while that element which approaches the locking lever bearing during the upward motion of the tilting frame comprises a cross bar attached to one upper arm or one upper pair of arms of the four-joint guide, said cross bar having a transverse guide hole for the actuating rod; and a sleeve is provided, movable on the cross bar and, in one of its positions, closing the top of the guide hole, such sleeve being provided as a setting member.

In another embodiment of the invention the actuating mechanism for the additional locking mechanism contains a linkage for the producing of the actuating motions of the locking hook from the tilt support motions, this linkage including an elastically resilient force transmitting element and a counterlocking device.

Another embodiment of the invention provides for the actuating mechanism of the additional locking mechanism to be formed essentially of a gravity lever mounted to or formed on the locking hook, and of a counterlocking device.

The counterlocking device provided in these last two embodiments of the invention can contain a detent pawl mounted on the tilt support so as to pivot about a pin parallel to the pivot pin of the locking hook. This detent pawl can be designed in the manner of a gravity lever inserting itself in counterlocking position when the locking hook is in its tilted position on the tilt support.

The device according to the invention is also shown as comprising two or more identical tilting or lifting-tilting devices selectively shiftable to separate, independent drive controls for emptying small containers and to a joint drive control for emptying large containers. Each one of the tilting devices or tilting-lifting devices has at least one additional gripper of its own and one additional locking mechanism of its own, which are independent of the respective other tilting or lift-tilting device.

The emptying device according to the invention is also shown as containing a tilt support designed to accommodate a large container and including two or more juxtaposed seats for small containers, there being provided in each seat of the tilt support at least one additional gripper and one additional locking mechanism identical in design, but independent of each other in their motions.

Embodiment examples of the invention are explained below in greater detail with reference to the drawings in which.

Figure 1:
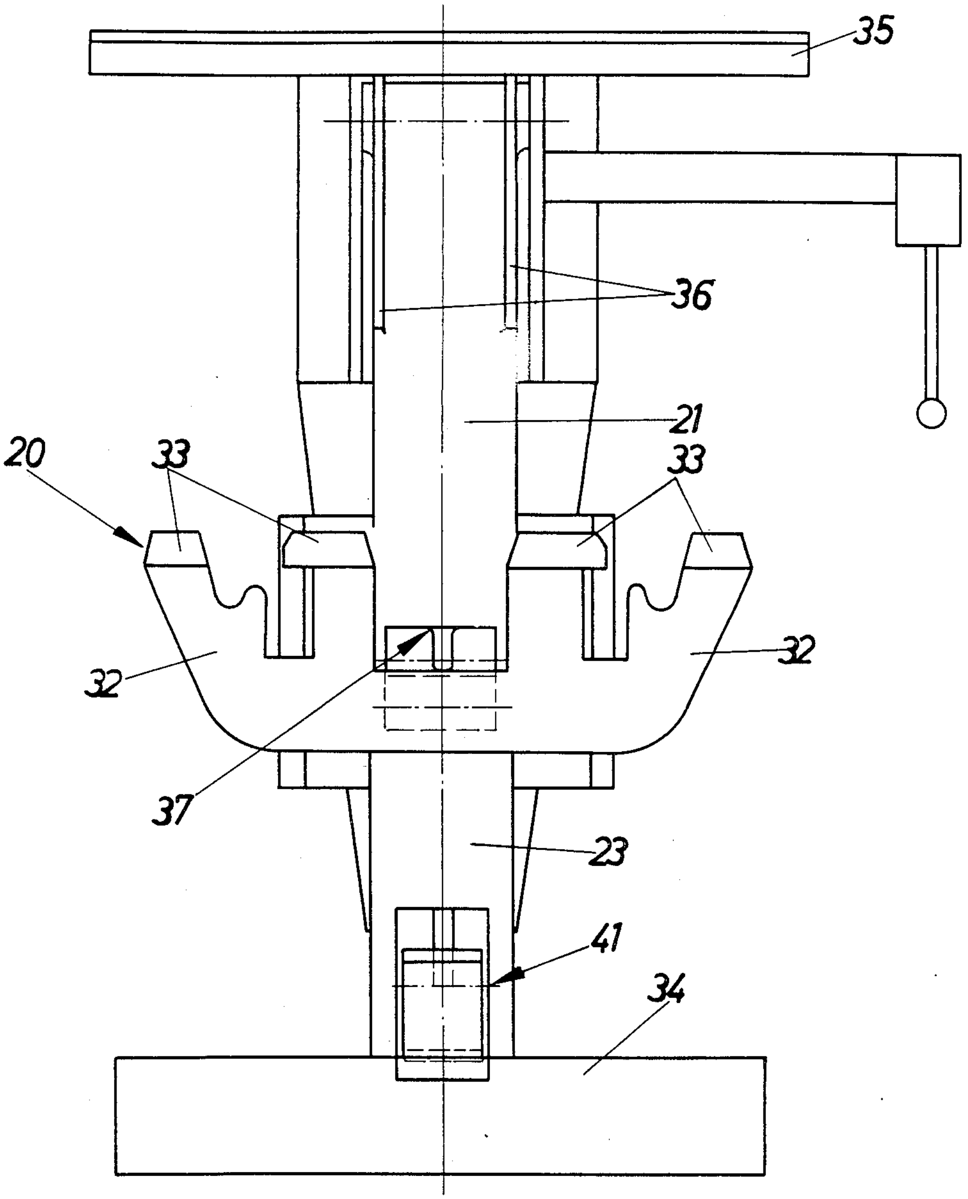
FIG. 1 shows the lifting-tilting mechanism of an emptying device according to the invention in an elevational view, looking in the loading direction of the containers to be emptied.

In the various embodiments shown in the drawings the emptying device has on the one hand a lifting-tilting mechanism 20 and on the other hand a pair of lifting-tilting mechanisms 20*a* and 20*b*. The lifting-tilting mechanism 20 or each one of the lifting-tilting mechanisms 20*a* and 20*b* contains a pivot arm structure which, in the example shown, is formed of a pair of pivot arms 21 which can pivot about a horizontal shaft 22 from the lower, initial position shown in FIG. 2 into an upper tilt-in end position similar to that shown in FIG. 13. Linked to the pivot arms 21 by means of a four-joint guide, i.e. an upper pull rod pair 24 and a lower pull rod pair 25 with hinge pins 26, 27, 28 and 29, is a tilt support 23. The lower pull rod pair 25 or one of the lower pull rods 25 is extended beyond its articulated axle 28 on the pivot arm 21 and joined at its end to an hydraulic cylinder-piston assembly 31 via a hinge pin.

Figure 3:
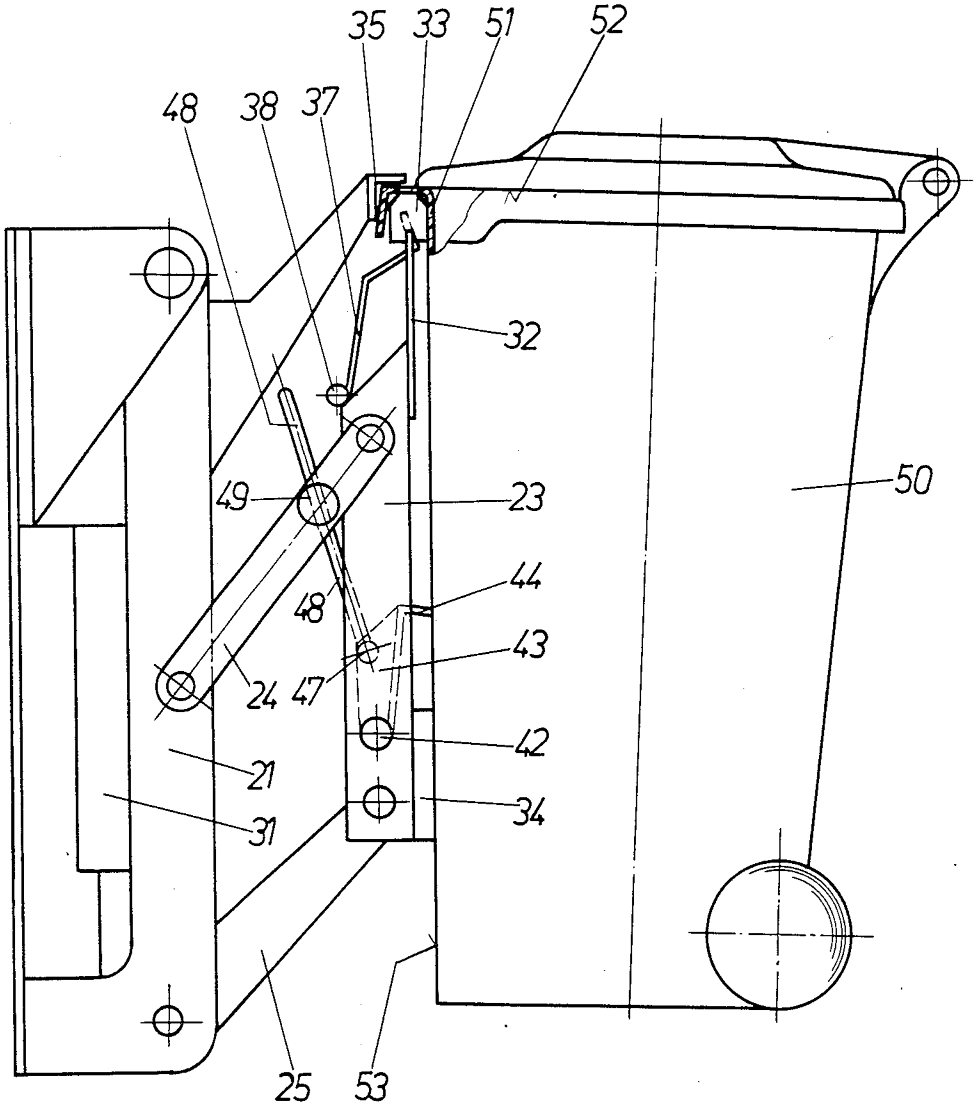
FIG. 3 shows the lifting-tilting device of FIGS. 1 and 2 in side elevational view, with the tilting frame raised and supporting a loaded garbage container of the first type.

The tilt support 23 has at its upper end a carrying plate 32 with four mutually spaced carrying elements 33. These carrying elements are designed and arranged for the purpose of gripping under a part on the rim 52 at the opening of a garbage container 50 which part is designed as a carrying strip 51. Provided at the lower part of the tilt support 23 is an abutment 34 which contacts the otherwise smooth front wall 53 of the garbage container 50 or the front wall parts 57 of a garbage container 55 or the front wall parts 57 of a garbage container 60. Rigidly fastened to the pivot arm 21 above the uppermost position of the carrying elements 33 relative to the pivot arm 21, as by means of holding arms 36, is a locking strip 35 of angular profile (see FIG. 3).

Figure 2:
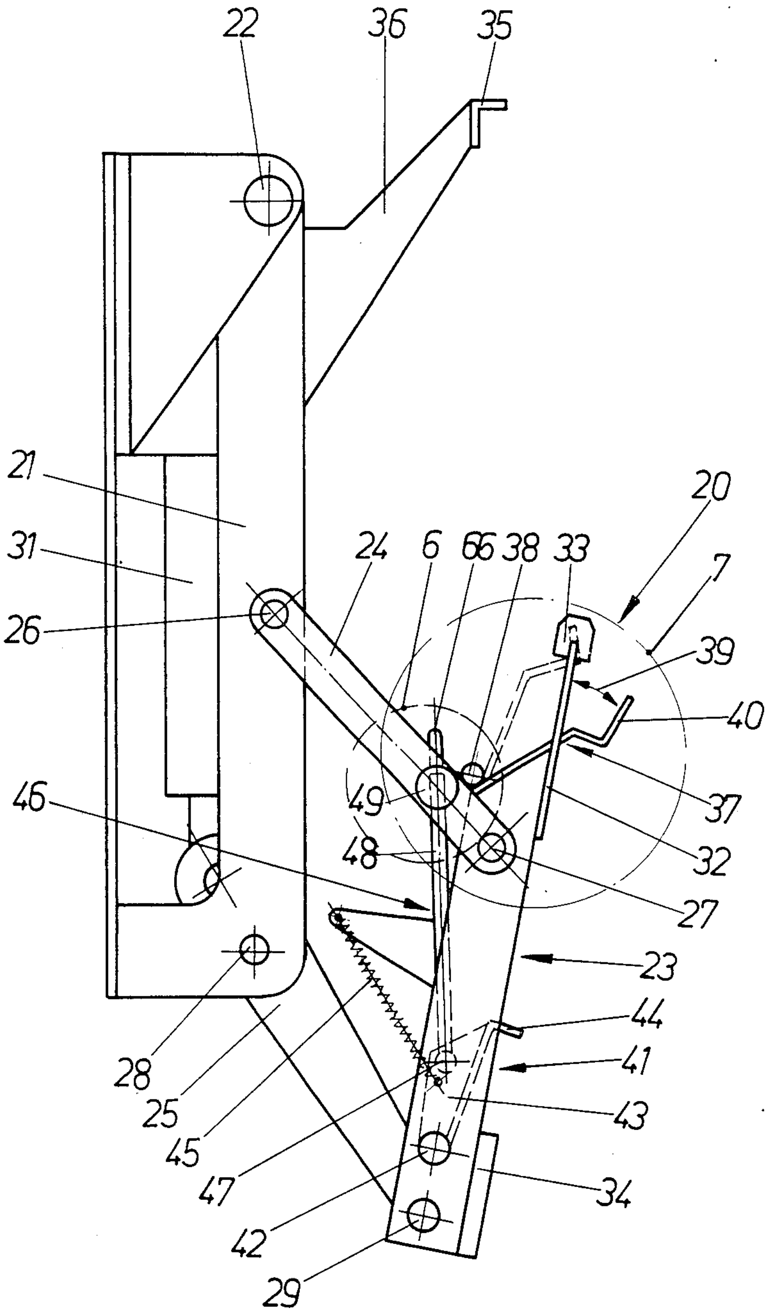
FIG. 2 shows the lifting-tilting device of FIG. 1 in side elevational view, in its initial or starting position.

The tilt support 23 has at its upper part a gripper 37 which is mounted to the tilt support 23 so as to pivot freely about the horizontal shaft 38 behind the carrying plate 32 in the sense of the double arrow 39, enabling it to swing from its gripping position shown in solid lines in FIG. 2 to its retracted or passive position shown in broken lines.

The gripper 37 represents an additional carrying element and for this purpose has a hookshaped gripper hook 40. The gripper hook 40 serves as an additional carrying element to pick up those garbage containers 55 which have in their fronts between the front wall parts 57, vertical grooves 56 which contain in their upper parts carrying strips 59 and in their central parts locking strips 58. The gripper 37 engages the carrying strip 59 of such a garbage container 55, while an additional locking mechanism 41 is provided on the tilt support 23 for the locking strip 58.

In the examples of FIGS. 1 through 6, this additional locking mechanism 41 contains a locking lever 43 which can pivot about a horizontal shaft 42 disposed in the lower part of the tilt support 23 and which is adapted at its free end, as by the form of a locking hook 44, to grip behind the locking strip 58. The locking lever 43 is normally held in its position at rest by a return spring 45 constructed as an extension spring, in which rest position the locking hook 44 is retracted relative to the abutment 34. The additional locking mechanism 41 contains an actuating mechanism 46 which, in the example of FIGS. 1 through 6, has an actuating rod 48 linked to the joint 47 on the locking lever 43. This actuating rod 48 is guided at its free end zone in a cross bar 49 rotatably mounted in the upper pull rod pair 24.

Figure 6:
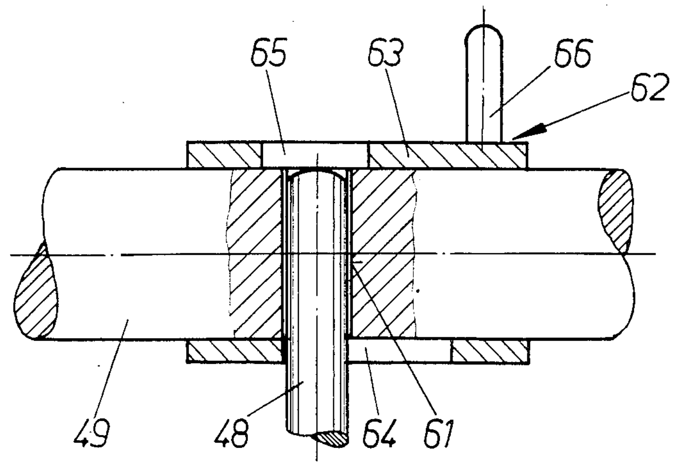
FIG. 6 is a larger scale detail of the area designated 6 in FIG. 2, partly in vertical section.
Figure 8:
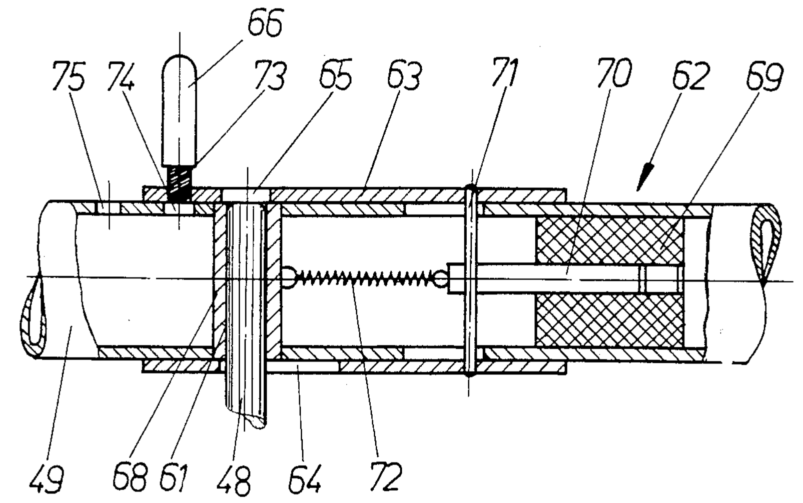
FIG. 8 shows a modified embodiment of the turn-on and turn-off device in a detail view like FIG. 6.
Figure 9:
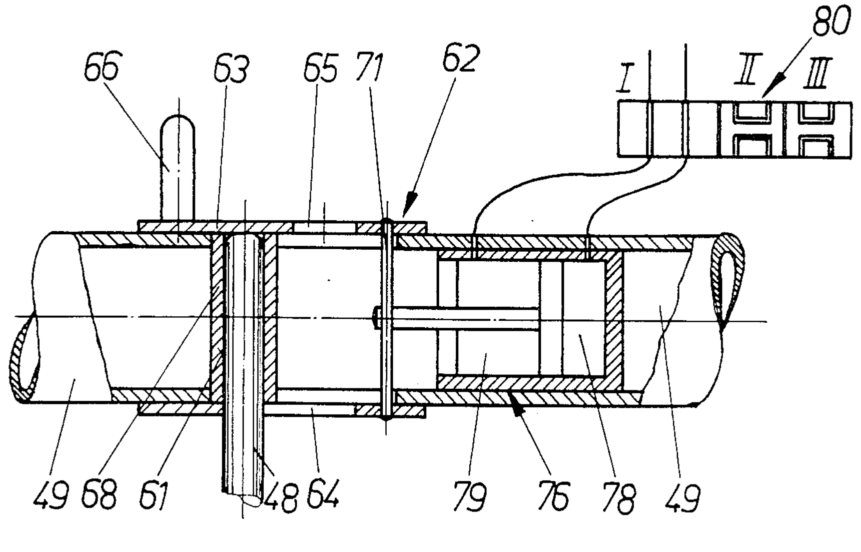
FIG. 9 shows another modified embodiment of the turn-on and turn-off device in a detail view like FIG. 6.

As FIGS. 6, 8 and 9 show, the cross bar 49 is provided with a transverse guide hole 61 which accommodates the actuating rod 48, and with a turn-on and turn-off device 62. In its simplest embodiment shown in FIG. 6, the turn-on and turn-off device 62 is a sleeve 63 which is slidable on the cross bar 49 and has on its under side an elongated hole 64 and on its top side a round hole 65. The elongated hole 64 accommodates the actuating rod 48, thereby limiting the back and forth mobility of the sleeve 63. The round hole 65 is opposite the one end of the elongated hole 64. An actuating handle 66 is mounted on the sleeve 63. The length of the actuating rod 48 is such that when the locking hook 44 is retracted in the initial position of the tilt support 23 as shown in FIG. 2, the actuating rod 48 ends in the interior of the guide hole 61 in the cross bar 49.

If a garbage container 50 with a carrying strip 51 at its opening rim 52 but with an otherwise smooth front wall 53 is to be handled and emptied using a device according to FIGS. 1 through 6, the position of the sleeve 63 is as shown in FIG. 6, with the round hole 65 located over the guide hole 61 in the cross bar 49. The garbage container 50 is applied to the tilt support 23 in such a manner that the gripper hook 40 makes contact with the smooth wall 53 of the garbage container 50 and is pivoted counterclockwise or in the direction of the carrying plate 32. During this motion the gripper hook 40 slides into the carrying strip 51 of the garbage container 50. As the pull rod pairs 24 and 25 swing up, whereby the tilt carrier 23 is raised, the garbage container 50 is picked up by engagement of its carrying strip 51 with the carrying elements 33 and lifted. Due to the upswing of the upper pull rods 24 the cross bar 49 relatively approaches the pivot pin 42 of the locking lever 43; that is, the pin 42 advances with respect to the bar 49. But the locking lever 43 is held or biased in its aligned position with the rod 48 at the tilt support 23 by the return spring 45. The tilt support 23 has been raised to the underside of the locking strip 35, thereby being locked and secured against sliding off the carrying elements 33 during the ensuing tilting process.

If a different garbage container 60 (FIG. 5) with a carrying strip 51 at its opening rim 52 and with a vertical groove 56 at the lower part of its front wall 57 having a locking strip 58 extending transversely therein is to be emptied, then that position of the sleeve 63 is to be used, wherein the guide hole 61 is covered by the solid part of the sleeve. When the garbage container 60 is applied to the tilt support 23, the gripper hook 40 makes early contact with the upper solid part of the container front wall 57 and is swung counterclockwise or towards the carrying plate 32. During the upswing of the pull rod pairs 24 and 25 and the raising of the tilt support 23 the carrying elements 33 will then engage the carrying strip 51 on the opening rim 52 of the garbage container 60. As the cross bar 49 gets closer to the pivot pin 42 of the locking lever 43, the actuating rod 48 is prevented by the solid part of sleeve 63 from sliding through the guide hole 61. The actuating rod 48 is thus pushed against the locking lever 43 so that the latter is pivoted clockwise as shown into the vertical groove 56 of the garbage container 60 against the effect of the return spring 45, its locking hook 44 engaging the locking strip 58. The locking hook 44 can release the locking strip 58 only when the tilt support 23 is lowered into its position at rest as shown in FIG. 2.

Figure 4:
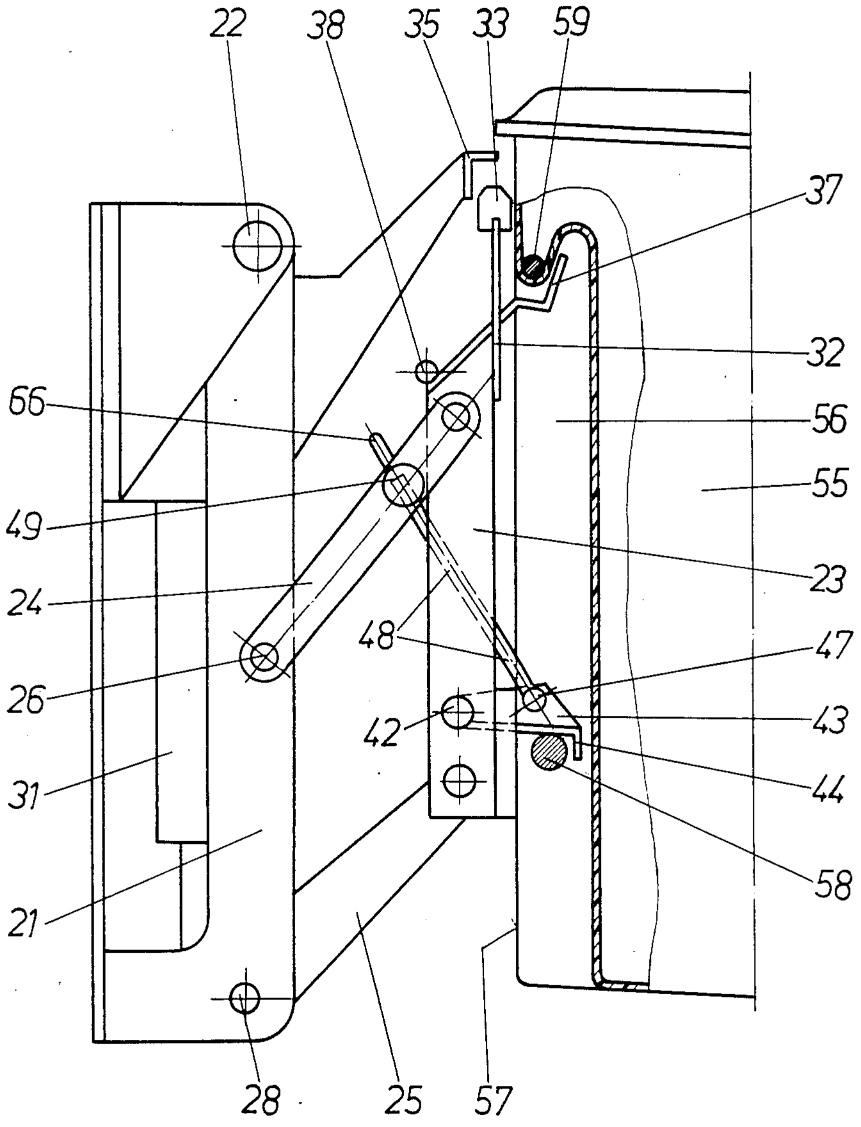
FIG. 4 shows the lifting-tilting device of FIGS. 1 and 2 in the position of FIG. 3, except supporting a loaded garbage container of a second type.
Figure 5:
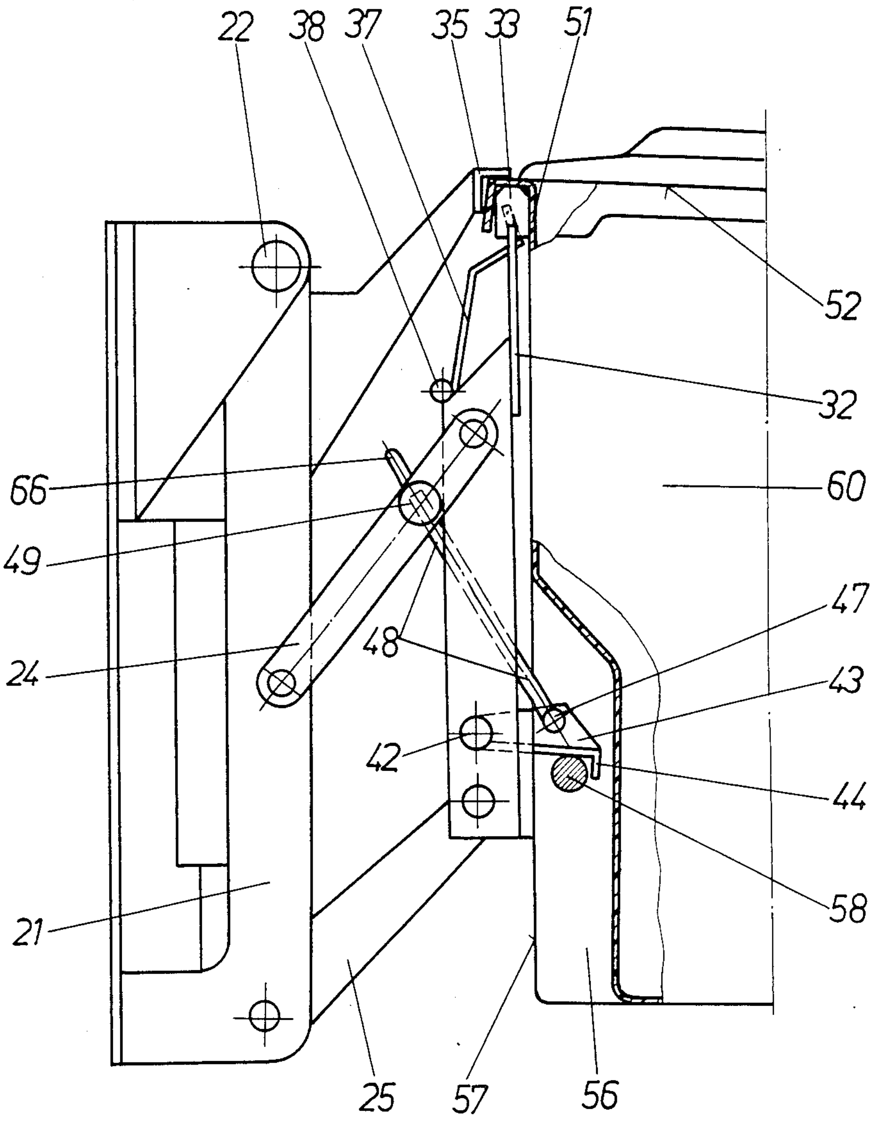
FIG. 5 shows the lifting-tilting device of FIGS. 1 and 2 in the position of FIG. 3 except supporting a loaded garbage container of a third type.

If a garbage container 55 with a vertical groove 56 and carrying strip 59 disposed therein and having a locking strip 58 is to be handled and emptied, then that position of the sleeve 63 is also used wherein the guide hole 61 is covered by a solid sleeve part. When the garbage container 55 is applied to the tilt support 23, the gripper hook 40 of the gripper 37 enters the vertical groove 56 as seen in FIG. 4. As the tilt support 23 is raised, the carrying strip 59 is gripped by the gripper hook 40 whereas the carrying elements 33 remain free. The locking lever 43 is actuated by the bar 49 and rod 48 and the locking hook 44 engages the locking strip 58 in the same manner as described above in connection with the emptying of the garbage container 60.

If garbage containers like 55 and garbage containers like 60 with shorter or longer vertical grooves 56 respectively are to be emptied alternately, no repositioning of the sleeve 63 is necessary. But if garbage containers like 50 without vertical grooves and garbage containers like 55 with long vertical grooves or garbage containers 60 with short vertical grooves are to be emptied alternately, the sleeve 63 must of course be repositioned accordingly every time. However, no repositioning of the sleeve 63 is required if both an upper and a lower cross bar are provided, such as the carrying strips 59 and the locking strips 58, on garbage containers 50 of the smooth front wall variety (wall 53), since these cross bars will then be disposed outside of the smooth container wall.

Figure 7:
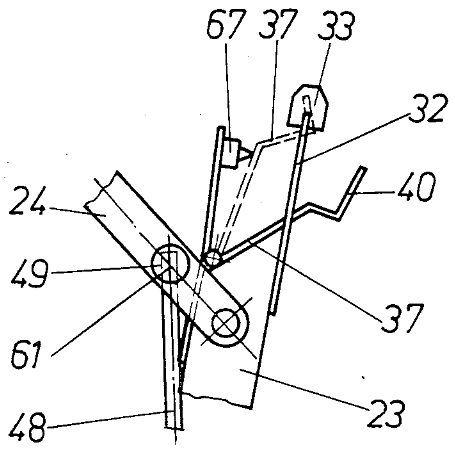
FIG. 7 is a detail of the area designated 7 in FIG. 2 but additionally showing a switch actuator controlled by the gripper device.

In the examples of FIGS. 7 through 9 the basic design of the emptying as per FIGS. 1 through 6 is maintained. As FIG. 7 shows, an additional switching element 67 is mounted on the tilt support 23, in addition to the structure according to FIGS. 1 through 6, in such a manner that the gripper 37 can engage the switching element 67, reversing the switching position thereof for the gripper's retracted or ineffective passive position shown in broken lines, to which it has been shifted counterclockwise or towards the carrying plate 32. The switching element 67 may be an electrical micro switch, a pressure medium valve, or of a mechanical nature.

In the example of FIG. 8 the cross bar 49 is tubular while the guide hole 61 is formed in a bushing 68 inserted transversely into the tubular cross bar 49. Again, the sleeve 63 with its elongated hole 64 and the opposite round hole 65 is movably mounted on the outside of the cross bar 49. An electromagnet 69 with plunger core 70 is installed inside the tubular cross bar 49. The plunger core 70 is connected to the sleeve 63 by a cross bolt 71 and supports a return spring 72 which is disposed inside the cross bar 49 and always tends to pull the sleeve 63 back or to the left into its position wherein the guide hole 61 is covered by a solid part of the sleeve 63. When the electromagnet 69 is energized by applying an electric current, the plunger core 70 will pull the sleeve 63 to the right against the force of the return spring 72 into the position shown in FIG. 8 in which the exit of the guide hole 61 is open due to the presence of the round hole 65 in the sleeve 63. When the electric current is shut off, the return spring 72 will pull the sleeve 63 back or to the left into its initial position, in which it covers the exit of the guide hole 61.

To be able to lock the sleeve 63 in the one or other position, the actuating handle 66 is provided in this example with a thread 73 which can be screwed into the one or the other locking hole 74, 75 if only containers of the one or the other type are to be emptied. Together with the turn-on and turn-off device 62 shown in FIG. 8, the switching element shown in FIG. 7 is to be incorporated in the manner of an electric switch. When emptying a garbage container 50 of the type having a smooth front wall 53, the gripper 37 is pushed into the position shown in broken lines in FIG. 7 whereby the electric switching element 67 is actuated to turn on the electric current for the electromagnet 69. This causes the sleeve 63 to be pulled into the position shown in FIG. 8 in which the actuating rod 48 can penetrate the round hole 65 so that the locking lever 43 and the locking hook 44 remain retracted in their position at rest.

When a garbage container 55 is being emptied, the gripper 37 will not be pivoted and, accordingly, the energizing current for the electromagnet 69 will not be turned on. Under the influence of the return spring 72 the sleeve 63 remains in its position wherein it closes the top of the guide hole 61. Therefore, the locking lever 43 and the locking hook 44 will be actuated during the upswing of the pull rod pairs 24 and 25. If the intention is to actuate also the additional locking mechanism 41 in addition to the lock on the locking strip 35 when emptying a garbage container 60 with a short vertical groove 56, then the sleeve 63 must be locked in its position wherein it closes the top of the guide hole 61, this being effected by screwing the thread 73 into the locking hole 75 so that the electromagnet 69 and the plunger core 70 are not able to pull the sleeve 63 into that position wherein the top of the guide hole 61 is open. The sleeve 63 can also be locked by means of the thread 73 and the locking hole 75 if garbage containers 55 with long vertical grooves 56 and garbage containers 60 with short vertical grooves 56 are to be emptied alternately.

FIG. 9 shows a turn-on and turn-off device 62 in which a dual-action cylinder piston assembly 76 for a pressure medium such as hydraulic fluid is provided. The piston rod of this cylinder-piston assembly 76 is connected to the sleeve 63 via the cross bolt 71. As in the examples of FIGS. 6 and 8 the sleeve 63 has an elongated hole 64 and a round hole 65 opposite one end of the elongated hole 64. To be able to install the cylinder-piston assembly 76 in the interior, the cross bar 49 is designed in the manner of a tube in this example also, and contains a bushing 68 forming the guide hole 61. In FIG. 9, the sleeve 63 is shown in that position wherein it closes the guide hole 61. In addition to the cylinder-piston assembly 76 the sleeve 63 also has an actuating handle 66. The turn-on and turn-off device thus formed can be so controlled that the switching element 67 shown in FIG. 7 is utilized as a switching valve for a pneumatic or hydraulic pressure medium. When the gripper 37 is pushed into its passive position shown in broken lines in FIG. 7 during the emptying of a garbage container 50 with a smooth front wall 53, it actuates the switching element 67 in the sense that the rear fluid chamber is acted upon. The piston rod then extends to the left and the sleeve 63 is brought into that position wherein the exit of the guide hole 61 is bared by the round hole 65. The additional locking mechanism 41 is then not actuated. When emptying a garbage container that has a long vertical groove 56, the gripper 37 remains in its gripping position. This results in the switching valve 67 being not actuated. Now the front fluid chamber 79 of the cylinder-piston assembly 76 is acted upon, and the piston rod retracts or moves to the right. The guide hole 61 is covered by the solid part of the sleeve 63. Accordingly, the additional locking mechanism 41 is therefore actuated during the upswing of the pull rod pairs 24 and 25.

To be able to lock the sleeve 63 in either its one or its other position in the example of the turn-on and turn-off device 62 shown in FIG. 9, an additional switching valve 80 is provided, with three positions (I, II, III) connected between the switching device shown in FIG. 7 as the switching element 67 and the cylinder-piston assembly 76. These three switching positions are the following:

In switching position I the fluid lines from the switching valve controlled by the switching element 67 and leading to the two chambers 78 and 79 of the cylinder piston assembly 76 are free. The sleeve 63 is automatically hydraulically controlled in the already above-described sense, except that the additional locking mechanism 41 does not become engaged when garbage containers 60 with short vertical grooves 56 are involved. But in switching position II the fluid lines coming from the switching valve controlled by the switching element 67 are in communication with each other, and the other fluid lines connected directly to the chambers 78 and 79 of the cylinder-piston assembly 76 are blocked. This switching position is to be used when only garbage containers of the same type or garbage containers 60 with short vertical grooves 56 in front are to be emptied alternately. In the special case, however, of emptying exclusively either garbage containers 55 with long vertical grooves 56 in front or else exclusively garbage containers 60 with short vertical grooves 56 in front, the sleeve 63 is to be brought into its position wherein it closes the guide hole 61 and is locked in this position through the medium of the switching position II of the additional switching valve 80. To empty garbage containers 50 with smooth front walls 53 exclusively, the sleeve 63 is to be brought into its position wherein it keeps the guide hole 61 open by means of the round hole 65, and is locked in this position through the medium of the switching position II of the additional switching valve 80.

The switching position III of the additional switching valve 80 provides for the short-circuiting to each other of the fluid lines coming from the switching valve controlled by the switching element 67 and also for the short-circuiting of the fluid lines connected directly to the two chambers 78 and 79 of the cylinder-piston assembly 76. This makes it possible to move the sleeve 63 into the desired position by means of the actuating handle 66, either for manual operation or else for putting the sleeve 63 into a desired position in which it can then be locked by operation of the additional switching valve 80 from the switching position III to the switching position II.

Figure 10:
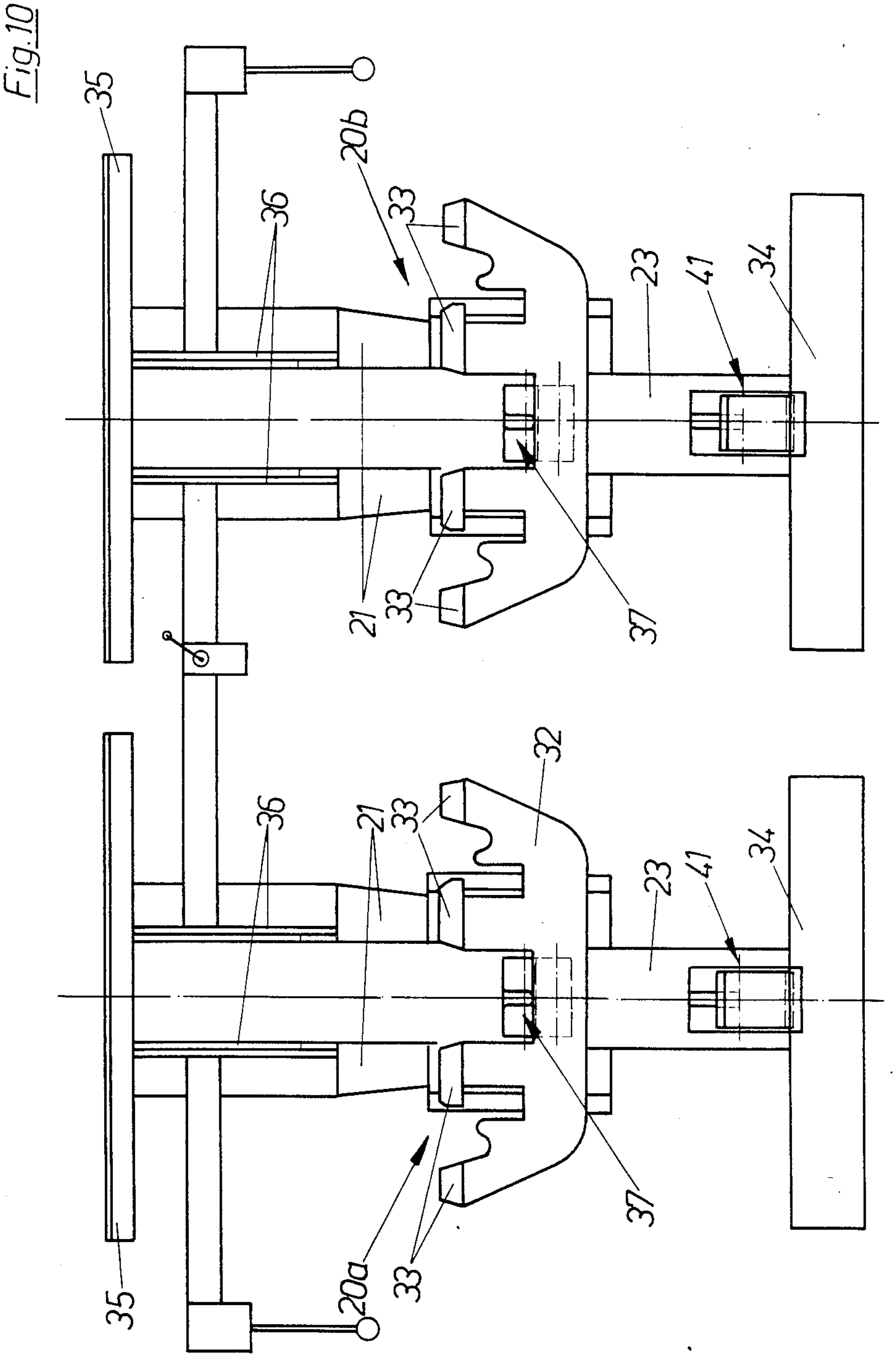
FIG. 10 shows an embodiment of the emptying device according to the invention characterized by two lifting-tilting devices of the type shown in FIG. 1.

In the embodiment according to FIG. 10, the emptying device contains two identical lifting-tilting mechanisms 20*a* and 20*b*. One control common to both lifting-tilting mechanisms 20*a* and 20*b* is provided which makes it possible to actuate selectively either each one of the two lifting-tilting mechanisms 20*a* and 20*b* independently of the other for emptying smaller garbage containers, or to activate both lifting-tilting mechanisms jointly and synchronously to empty larger garbage containers. Each one of the two lifting-tilting mechanisms 20*a* and 20*b* is equipped with its own gripper 37 and with its own additional locking mechanism 41. Regardless of the respective operating mode of the two lifting-tilting mechanisms 20*a* and 20*b*, the grippers 37 are independent in their motion and operating mode. By the same token, the additional locking mechanism 41 of each of the two lifting-tilting mechanisms 20*a* and 20*b* is independent in motion and operation of other.

Figure 11:
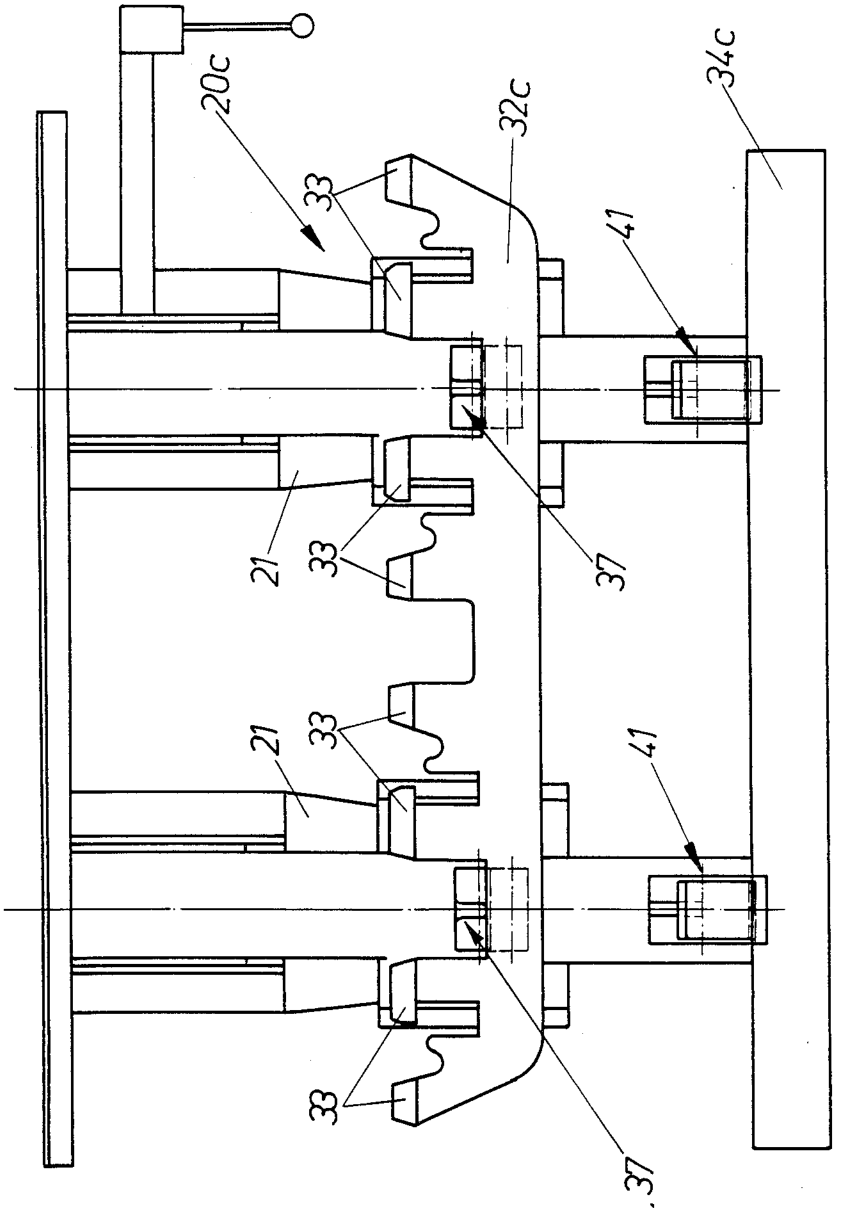
FIG. 11 shows still another embodiment of the emptying device according to the invention characterized by a widened tilt support of the type shown in FIG. 1.

FIG. 11 shows an embodiment of the emptying device in which there is provided on a common lifting-tilting mechanism 20*c* a carrying plate 32*c* twice as wide as the carrying plate 32 in the device of FIG. 1, and also an abutment 34*c* which is also twice as wide as the abutment 34 in the device of FIG. 1. Therefore, two smaller garbage containers can be accommodated next to each other by the carrying plate 32*c* and emptied jointly in a device according to FIG. 11. As FIG. 11 shows, this lifting-tilting mechanism 20*c* has two grippers 37 mounted and movable independently of each other, and two additional locking mechanisms 41 also mounted and operable independently of each other. Thus, it is possible with a lifting-tilting mechanism 32*c* according to FIG. 11 to empty simultaneously two garbage containers of different systems, such as a garbage container 50 with a smooth front wall 53 and a garbage container 55 with a long vertical groove 56 at its front. Whereas the gripper 37 at the seat accepting the garbage container 50 is being pushed into its passive position and the additional locking mechanism 41 at this seat remains unactuated, the gripper 37 at the seat accepting the garbage container 55 engages the vertical groove 56, gripping under the carrying strip 59, and the additional locking mechanism 41 there is being actuated in order to engage the vertical groove 56 and grip behind the locking strip 58.

Figure 12:
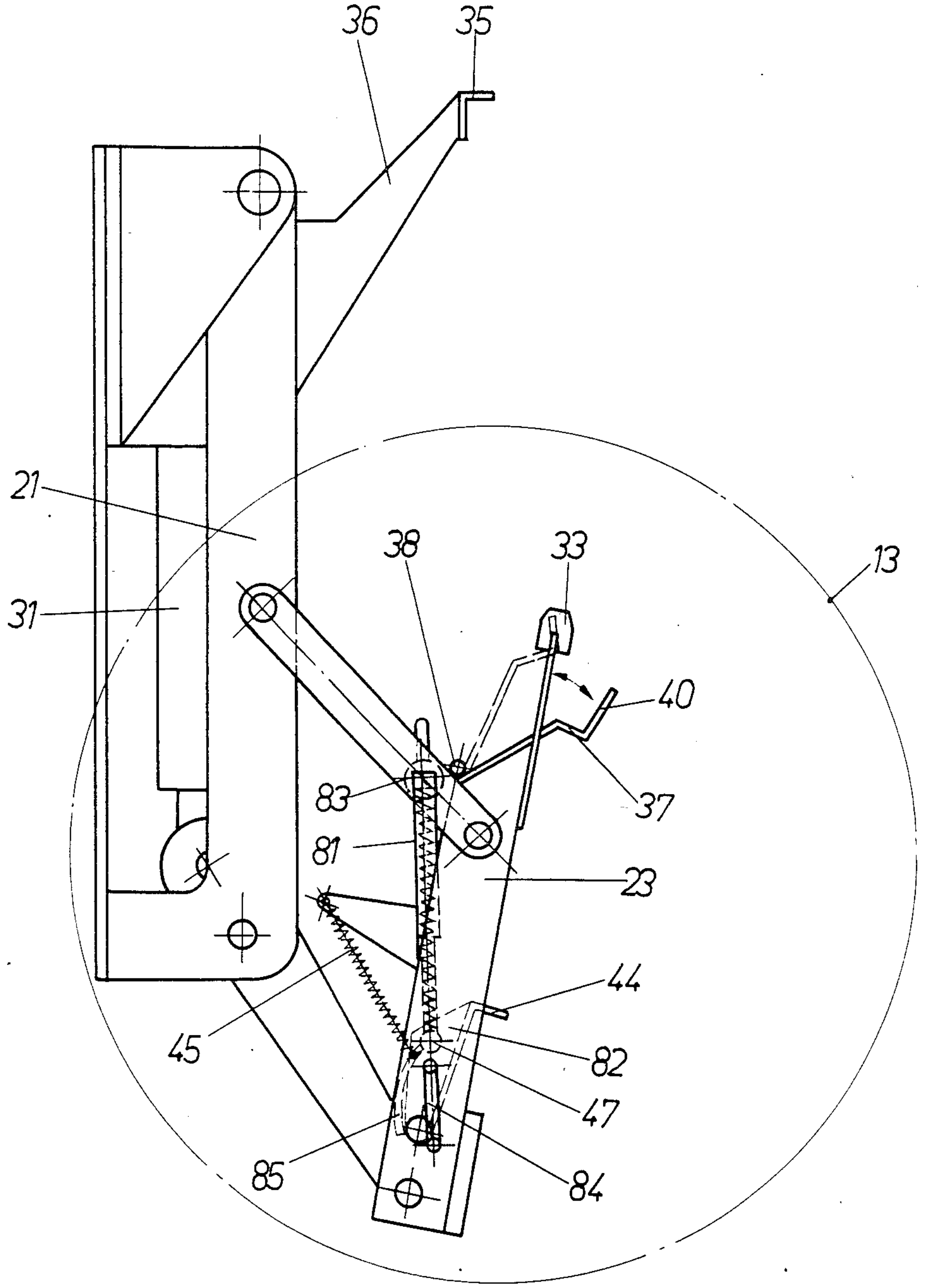
FIG. 12 shows in side elevation yet another embodiment of the emptying device according to the invention.
Figure 13:
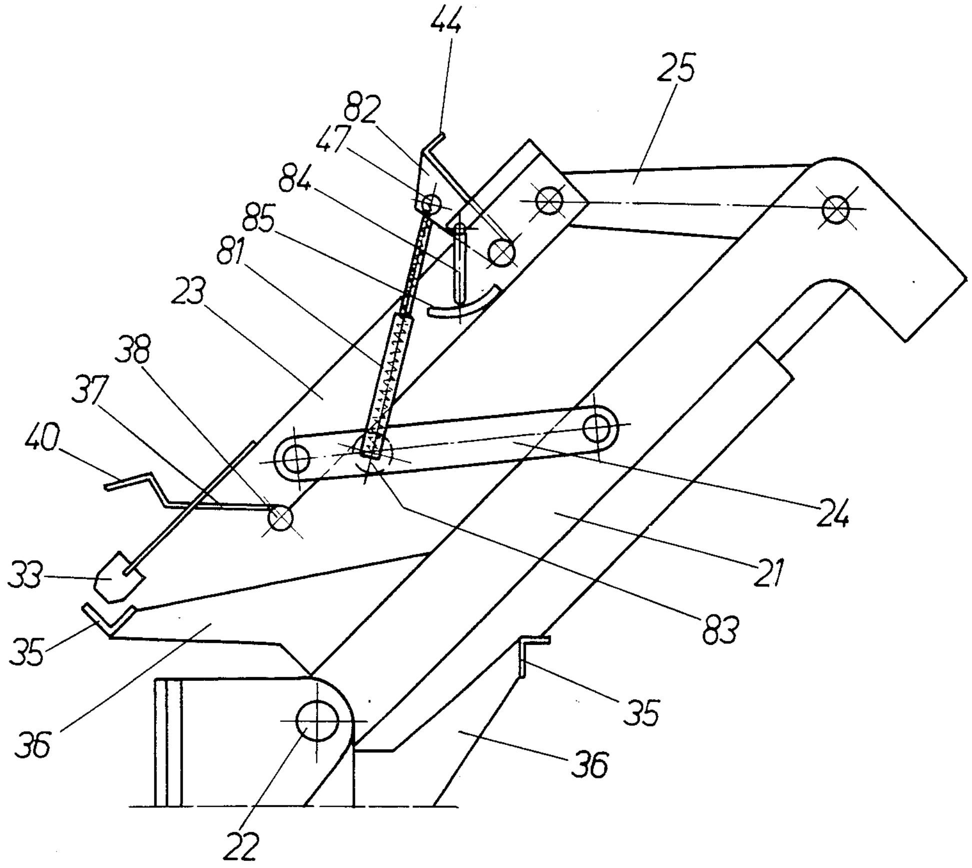
FIG. 13 is a detail of the area designated 13 in FIG. 12 but showing the tilted-in position of the present device with the locking hook in its locking position and in counterlocked condition.

In the embodiment example of FIGS. 12 and 13 the basic design of the lifting-tilting mechanism according to FIGS. 1 and 2 is maintained. But, to save the switching requirements, there is provided as the actuating device 46 of the additional locking mechanism 41 a telescopic actuating rod 81 which can be pushed together axially in telescoping fashion against spring action. The lower end of this actuating rod 81 is hinged at 47 to the locking lever 82, and its upper end is fastened to a horizontally disposed cross bar 83 rotatably mounted between the upper pull rod pair 24. As in the examples of FIGS. 1 through 11, when emptying garbage containers 50 with smooth front walls, the gripper 37 is swung into its passive position by the smooth front wall of the garbage container 50. Although the cross bar 83 gets closer to the pivot pin 42 of the locking lever 82 during the upswing of the pull rod pairs 24 and 25, the smooth front wall of the garbage container 50 offers resistance to the outward motion of the locking lever 82 or locking hook 44. This prevents the outward motion of the locking lever, and the telescoping actuating rod is compressed axially against spring force.

When emptying garbage containers 55 with long vertical grooves 56, the locking hook 44 of the locking lever 82 grips, in the vertical groove 56, behind the locking strip 58. However, since the actuating rod 81, due to its axial, spring-loaded telescoping action, is not suited to support the load exerted on the locking hook 44 and the locking lever 82 via the locking strip 58 in the tilted-in position of the garbage container 55, there is pivotably mounted on the locking lever 82 a counterlocking lever 84, designed as a gravity lever, which pivots during the tilting motion of the tilt support 23 in conformance with a bowl-shaped, sturdy support element 85 mounted on the tilt support 23, thereby transferring the load from the locking lever 82 to the tilt support 23. But the counterlocking lever 84 can pivot only in conformance with the support element 85 when the locking lever 82 is swung into its locking position.

In this example, the actuation of the additional locking mechanism 41 is independent of the motion and position of the gripper 37. Therefore, the same locking processes take place also when a garbage container 60 with a short vertical groove 56 in front is being emptied, where the gripper 37 is swung into its passive position upright, but the locking hook 44 of the locking lever 82 can pivot, in the vertical groove 56, behind the locking strip 58.

Figure 14:
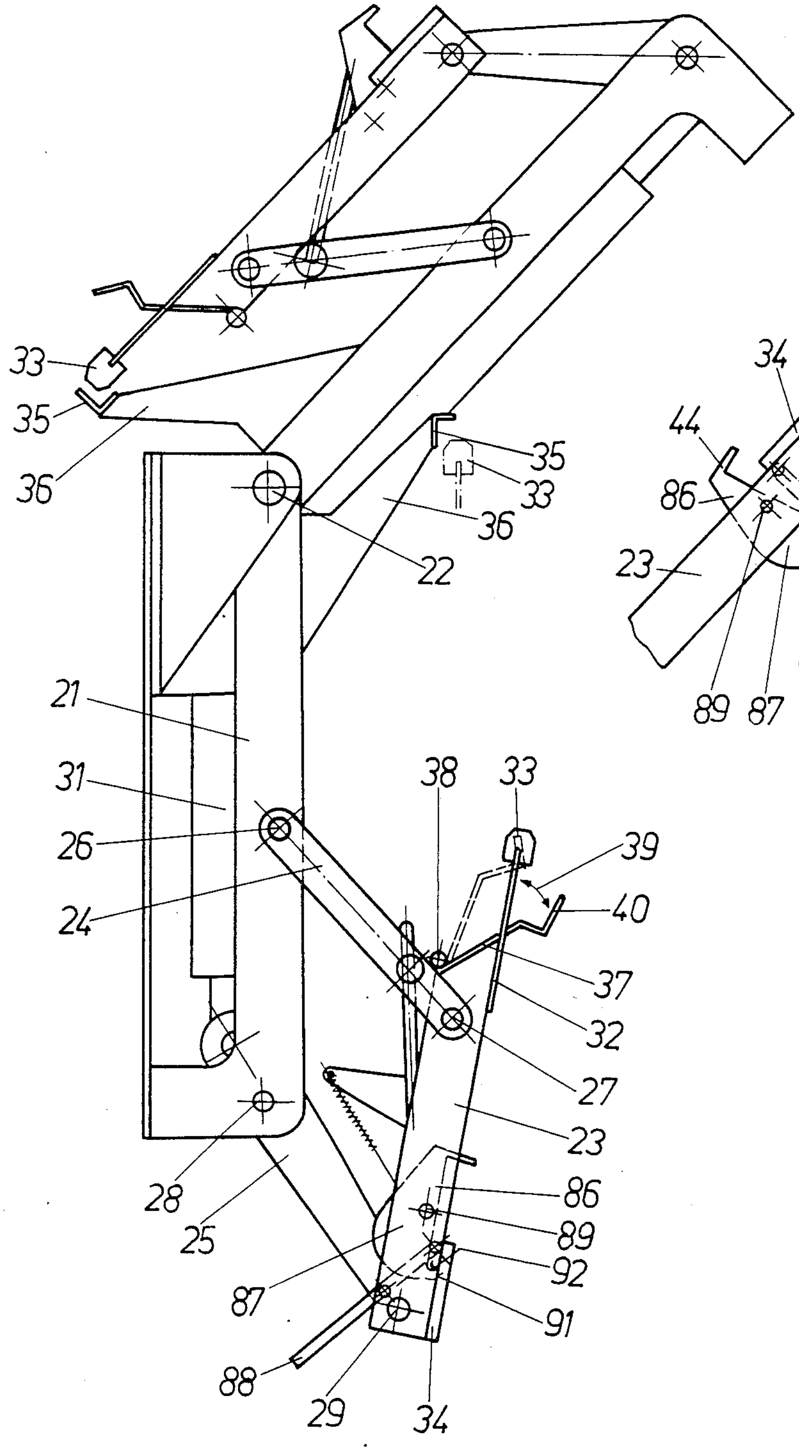
FIG. 14 is a side elevational view of yet another embodiment of the emptying device according to the invention, showing a modified additional locking mechanism of the type shown in FIG. 2.
Figure 15:
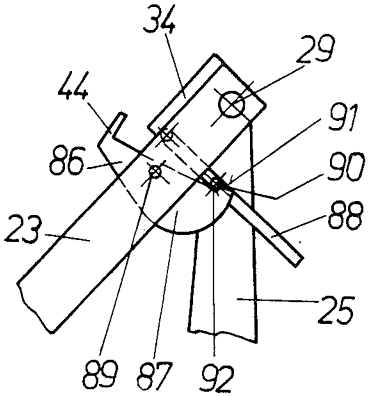
FIG. 15 is a detail of the modified additional locking mechanism of FIG. 14 in the locked position and also in its counterlocked position when the device is in the tilted-in position of FIG. 13.

In the example of FIGS. 14 and 15 the basic design of the lifting-tilting device according to FIGS. 1 and 2 is again maintained. In this example, the gripper 37 is of the same design as in the example of FIGS. 1 and 2 and, as therein, is also mounted so as to pivot unrestrictedly and freely about a horizontal shaft 38 to be able to swing between a gripping position and a passive, retracted position.

The additional locking device, in this case, has a dual-armed locking lever 86, one of its lever arms supporting the locking hook 44 and its second lever arm being designed as a gravity lever 87. In addition to the locking lever 86 the additional locking mechanism 41 has a counterlocking lever 88 mounted on the tilt support 23 so as to pivot about a horizontal shaft 89 and carrying a counterlock element 90. As may be seen from FIG. 15, due to its gravity arm 87, the locking lever 86 swings clockwise in the starting stage of the tilting motion of the tilt support 23 out of its retracted position and brings its locking hook 44 behind the locking strip 58 in the vertical groove 56 of the garbage container 55 or 60. In its position engaging the locking strip 58 a further pivoting motion of the locking lever 86 is impossible so that it remains in its position relative to the tilt support 23 as shown in FIG. 15. Simultaneously with the pivoting motion of the locking lever 86, the counterlocking lever 88 also pivots about its horizontal shaft until the counterlocking element 90 mounted on the counterlocking lever 88 reaches a counterseat 92 provided on the locking lever 86 by traveling along a pilot edge 91. Upon reaching this position, the locking lever 86 and the counterlocking lever 88 are interlocked so that the can unlock only when the tilt support 23 is in the last phase of its return tilting motion. In the examples of FIGS. 14 and 15 the actuation of the additional locking mechanism 41 is also independent of the actuation of the gripper 37. If garbage containers 50 with smooth front walls are being emptied the locking hook 44 is prevented by the container wall 53 from swinging out. If garbage containers 55 with long vertical grooves 56 in front and garbage containers 60 with short vertical grooves 56 in front are being emptied, it is possible for the locking lever 86 to swing out, regardless of whether the gripper 37 becomes active or not.

I claim:

1. Device to empty containers of different design, such as garbage containers of different systems, into a pour-in opening by means of a lifting-tilting mechanism which is equipped with carrying elements for holding the container during the emptying process and for gripping the under-sides of existing projecting parts of the container, said lifting-tilting mechanism having an upwardly movable tilt support provided with an abutment adapted for engagement with the container wall, said abutment being mounted so as to be spaced below said carrying elements and said lifting-tilting mechanism having at least one locking mechanism to secure the container against dislodgement of its projecting parts from said carrying elements and pivotal dislodgement of the container wall from the tilt support abutment, characterized in that there is provided on the tilt support (23) at least one gripper (37) adapted as an additional carrying element and at least one additional locking mechanism (41) adapted as a lock, said gripper (37) being movable from a gripping position in which it projects from the tilt support (23) towards a container (50, 55, 60) to a passive, retracted position into which it is elastically received, said additional locking mechanism (41) containing at least one locking hook (44) which is movably mounted with respect to the tilt support (23) and advanceable in the space located between the abutment (34) and the gripper (37) by means of an actuating mechanism (46) controlled by the motion of the tilt support (23) whereby said hook (44) can be moved during the emptying process into an existing hook seat (56, 58) on the container wall at a location opposite to the tilt support (23), and in that said actuating mechanism (46) includes a selector means for selectively allowing the locking hook to operate in an operative or an inoperative mode.

2. A device according to claim 1, characterized in that the gripper (37) is provided with a switch actuator (67) which constitutes the said selector means.

3. A device according to claim 2, characterized in that the switch actuator (67), the selector means, and/or the actuating mechanism (46) of the additional locking mechanism (41) are adapted to be selectively separable in their mutual interactive connection.

4. A device according to claim 1, characterized in that the gripper (37) is mounted so as to be pivotable about a horizontal shaft (38), against its own weight thereon from its gripping position in which it projects from the tilt support (23) into its passive position in which it is retracted to the tilt support (23).

5. A device according to claim 1, characterized in that the gripper (37) is adapted and mounted to grip a handle-like element (59) provided on the wall of the container (55, 60) to be emptied.

6. A device according to claim 1, characterized in that the additional locking mechanism (41) contains a locking lever (43) pivotable about a horizontal shaft (42) and further contains an actuating rod (48) linked to said locking lever.

7. A device according to claim 6, characterized in that the actuating rod (48) is guided so as to be axially movable in an element (49) which approaches the bearing (42) of the locking lever (43) during the upward motion of the tilt support (23), and in that an adjustable settable member (63) is provided to selectively block the axial motion of the actuating rod (48).

8. A device according to claim 7, characterized in that the tilt support (23) is mounted on a pivot arm (21) for its upward movement by means of a four-jointed guide (24, 25) and that the locking lever (43) is mounted in the lower area of the tilt support (23), said element which approaches the bearing of the locking lever (43) during the upward motion of the tilt support (23) comprising a cross bar (49) attached to an upper portion of said four-jointed guide (24) and having a transverse guide hole (61) for said actuating rod (48); said settable member comprising a sleeve (63) which is movable on the cross bar (49) and which in one of its positions closes the top of the guide hole (61) upwardly.

9. A device according to claim 1, characterized in that the additional locking mechanism (41) includes a locking lever (82) which carries the locking hook, and in that the actuating mechanism (46) of the additional locking mechanism (41) contains a linkage (81) equipped with an elastically resilient force transmission element, to derive the actuating motions of said locking lever (82) and locking hook (44) from the motions of the tilt support (23), and in that a counterlocking device (84,85) is provided for the locking lever (82) which supports the locking hook (44).

10. A device according to claim 1, characterized in that the actuating mechanism for the additional locking mechanism (41) has a locking lever (86) with a gravity arm (87) carrying the locking hook (44), and in that a counterlocking device (89 to 92) is provided for the locking lever (86) which supports the locking hook (44).

11. A device according to claim 10, characterized in that the counterlocking device (89 to 92) contains a counterlocking lever (84, 88) in the manner of a detent pawl pivotally mounted to the tilt support (23) about a shaft parallel to the pivot shaft of the locking lever (82, 86) which supports the locking hook (44).

12. A device according to claim 11, characterized in that the counterlocking lever (84, 88) is adapted to constitute a gravity lever inserting itself in counterlocking position in the manner of a detent pawl, for the tilted position of the tilt support (23).

13. A device according to claim 1, characterized in that two identical lifting-tilting mechanisms (20*a*, 20*b*) are provided and are selectively shiftable to separate, mutually independent drive controls for emptying small containers and to a joint drive control for emptying large containers, each one of the lifting-tilting mechanisms (20*a*, 20*b*) having at least one gripper (37) of its own and one additional locking mechanism (41) of its own which are independent of the respective other lifting-tilting mechanism or its corresponding parts.

14. A device according to claim 1, characterized in that the lifting-tilting mechanism (20*c*) has a tilt support (23, 32*c*) which is adapted for the accommodation of oversize containers and which contains two juxtaposed seats for smaller containers (50, 55, 60), there being provided at each seat of the tilt support (23, 32*c*) at least one additional gripper (37) and one additional locking mechanism (41) which, while being of identical design, are independent in their motions of the corresponding parts in the other seats.

15. A device according to claim 1, and further including a counterlocking device to automatically lock the locking hook in its advanced position.

* * * * *